(12) United States Patent
Ashmore et al.

(10) Patent No.: US 7,740,906 B2
(45) Date of Patent: Jun. 22, 2010

(54) WOOD PRESERVATIVES

(75) Inventors: John William Ashmore, Lansdale, PA (US); Tirthankar Ghosh, Oreland, PA (US); Jose Pineda Lalas, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1017 days.

(21) Appl. No.: 11/408,425

(22) Filed: Apr. 21, 2006

(65) Prior Publication Data

US 2006/0240263 A1  Oct. 26, 2006

Related U.S. Application Data

(60) Provisional application No. 60/673,556, filed on Apr. 21, 2005, provisional application No. 60/780,431, filed on Mar. 8, 2006.

(51) Int. Cl.
*B05D 7/06* (2006.01)
*B05D 7/08* (2006.01)
*B05D 1/00* (2006.01)
*C09K 15/14* (2006.01)

(52) U.S. Cl. ............... 427/181; 427/180; 427/297; 427/393; 427/397; 427/440; 106/15.05; 106/16; 106/18.13; 252/380; 424/630; 504/358; 504/359; 504/360

(58) Field of Classification Search ............... 427/180, 427/181
See application file for complete search history.

(56) References Cited

U.S. PATENT DOCUMENTS

| | | | |
|---|---|---|---|
| 3,870,557 A | 3/1975 | Fink et al. | |
| 3,945,834 A | 3/1976 | Clarke et al. | |
| 4,143,010 A | 3/1979 | Rak | |
| 4,683,260 A | 7/1987 | Wickert et al. | |
| 5,049,383 A | 9/1991 | Huth et al. | |
| 5,200,457 A | 4/1993 | Vasishth et al. | |
| 5,874,456 A | 2/1999 | McDade et al. | |
| 6,448,279 B1 | 9/2002 | Tseng et al. | |
| 6,485,790 B2 | 11/2002 | Walker et al. | |
| 6,521,288 B2 * | 2/2003 | Laks et al. | 427/180 |
| 6,610,282 B1 * | 8/2003 | Ghosh | 424/78.09 |
| 6,753,016 B2 * | 6/2004 | Ghosh | 424/604 |
| 6,753,035 B2 * | 6/2004 | Laks et al. | 427/180 |
| 2002/0061366 A1 | 5/2002 | Walker et al. | |
| 2003/0012883 A1 * | 1/2003 | Yu et al. | 427/393 |
| 2005/0255251 A1 * | 11/2005 | Hodge et al. | 427/397 |
| 2006/0147632 A1 * | 7/2006 | Zhang et al. | 427/297 |
| 2006/0246144 A1 * | 11/2006 | Gajanan et al. | 424/490 |
| 2006/0251688 A1 * | 11/2006 | Gajanan et al. | 424/401 |
| 2006/0288904 A1 * | 12/2006 | Leach et al. | 106/15.05 |
| 2007/0053950 A1 * | 3/2007 | Gajanan et al. | 424/408 |

FOREIGN PATENT DOCUMENTS

| | | |
|---|---|---|
| WO | WO9314630 | 8/1993 |
| WO | WO 96/27483 | 9/1996 |
| WO | WO9901522 | 1/1999 |

OTHER PUBLICATIONS

Liu, et al., Use of Nanoparticles for Controlled Release of Biocides in Solid Wood, J. Applied Polymer Science, vol. 79, pp. 458-465 (2001).
Liu, et al., Controlled Release of Biocides in Solid Wood. I. Efficacy Against Brown Rot Wood Decay Fungus, J. Applied Polymer Science, vol. 86, pp. 596-607 (2002).
Liu, et al., Controlled Release of Biocides in Solid Wood. II. Efficacy Against Trametes Versicolor and Gloeophyllum . . . , J. Applied Polymer Science, vol. 86, pp. 608-614 (2002).
Liu, et al., Controlled Release of Biocides in Solid Wood. III. Preparation and Characterization of Surfactant-Free Nanoparticles, vol. 86, pp. 615-621 (2002.

* cited by examiner

*Primary Examiner*—Joseph D Anthony
(74) *Attorney, Agent, or Firm*—Kenneth Crimaldi

(57) ABSTRACT

A method for preserving wood by contacting wood with a composition comprising an aqueous polymer dispersion, at least one surfactant, and a wood preservative.

5 Claims, No Drawings

WOOD PRESERVATIVES

This is a non-provisional application of prior pending U.S. provisional Application Ser. No. 60/673,556 filed on Apr. 21, 2005 and U.S. provisional Application Ser. No. 60/780,431 filed on Mar. 8, 2006.

The present invention relates to a method for treating wood to impart protection from wood-decaying organisms.

Use of waterborne polymers and biocides to treat wood has been reported, for example in WO 96/27483, which discloses a combination of surface treatment and implantation of biocide. However, implantation of biocide is not cost-effective nor practical, especially when treating large quantities of wood at a commercial treating facility.

The problem addressed by this invention is the need for a wood treatment method capable of imparting active ingredients further below the surface of wood than previously known methods without mechanical implantation of material.

STATEMENT OF THE INVENTION

The present invention is directed to a method for preserving wood by contacting wood with a composition comprising: (a) an aqueous polymer dispersion having an average particle size less than 1000 nm, in which the polymer has a $T_g$ less than 75° C.; (b) at least one surfactant selected from among nonionic and anionic surfactants; and (c) at least one wood preservative selected from among halogenated isothiazolone biocides, halogenated carbamate fungicides and azole fungicides.

The present invention is further directed to a method for preserving wood; said method comprising contacting wood with a composition comprising: (a) a polymer; (b) an organic solvent; and (c) at least one wood preservative selected from among halogenated isothiazolone biocides, halogenated carbamate fungicides and azole fungicides.

DETAILED DESCRIPTION OF THE INVENTION

All percentages and ppm values are on the basis of total weight of the composition, unless otherwise indicated. When the wood preservative is a halogenated isothiazolone biocide it preferably comprises a 3-isothiazolone having a $C_4$-$C_{12}$ N-alkyl substituent, more preferably a chlorinated 3-isothiazolone, and most preferably 4,5-dichloro-2-n-octyl-4-isothiazolin-3-one ("DCOIT"). The halogenated carbamate fungicide preferably comprises an iodopropargyl carbamate, such as IPBC, N n-butyl iodopropargyl carbamate. The term azole fungicide preferably comprises a triazole fungicide, more preferably Tebuconazole ((RS)-1-p-chlorophenyl-4,4-dimethyl-3-(1H-1,2,4-triazol-1-ylmethyl)pentan-3-ol) or Propiconazole(cis-trans-1-[2-(2,4-dichlorophenyl)-4-propyl-1,3-dioxolan-2-ylmethyl]-1H-1,2,4-triazole). Mixtures of wood biocides may be used. The term "acrylic polymers" refers to polymers comprising at least 50% monomer units derived from among acrylonitrile (AN); acrylamide (AM) and its N-substituted derivatives; acrylic acid (AA), methacrylic acid (MAA), and their esters; and itaconic acid (IA). Esters of AA and MAA include, but are not limited to, methyl methacrylate (MMA), ethyl methacrylate (EMA), butyl methacrylate (BMA), ethylhexyl methacrylate (EHMA), lauryl methacrylate (LMA), hydroxyethyl methacrylate (HEMA), methyl acrylate (MA), ethyl acrylate (EA), butyl acrylate (BA), ethylhexyl acrylate (EHA) and hydroxyethyl acrylate (HEA), phosphoethyl methacrylate (PEM) as well as other esters of AA or MAA, e.g., alkyl, hydroxyalkyl and aminoalkyl esters. Derivatives of acrylamide include, e.g., methylol acrylamide (MLAM). Acrylic polymers also may contain monomer units derived from other ethylenically unsaturated monomers, e.g., styrene or substituted styrenes; other $\alpha,\beta$-unsaturated carboxylic acids, esters and amides; vinyl esters or halides; etc. Preferably, an acrylic polymer contains less than 30% of these other monomer units, more preferably less than 10%, and most preferably the acrylic polymers are substantially free of monomer units other than those of AA, MA and their esters. An "acrylic-styrene copolymer" is a polymer at least 50% of whose monomer units are derived from among AA, MAA, esters of AA and MAA, AN, and styrene monomers. Styrene monomers include styrene (Sty) and substituted styrenes, e.g., $\alpha$-methylstyrene (AMS). Preferably, acrylic-styrene copolymers contain less than 20% of monomer units other than styrene or acrylic monomer units, more preferably less than 10%, and most preferably less than 5%. An "acrylic-vinyl acetate copolymer" is a polymer at least 50% of whose monomer units are derived from among AA, MAA, esters of AA and MAA, and vinyl acetate (VA). Preferably, acrylic-vinyl acetate copolymers contain less than 20% of monomer units other than acrylic or vinyl acetate monomer units, more preferably less than 10%, and most preferably less than 5%.

Polyurethane polymers also are suitable for use in this invention. Polyurethane polymers typically are formed from reaction of isocyanates with polyols, but may contain other functional groups derived from reaction of isocyanates with other monomers, e.g., amide groups derived from carboxylic acids, and ureas derived from amines, e.g. ethylene diamine (EDA) or other polymers, such as polyesters, e.g., polyesters derived from adipic acid and 1,6-hexanediol, 1,4-butanediol and/or neopentyl glycol, or polycarbonates, e.g. polycarbonates derived from poly 1,6-hexanediol carbonate. Suitable isocyanates include, e.g., methylene bis(4-cyclohexylisocyanate) (MCI), methylene bis(4-phenylisocyanate) (MDI), hexamethylene diisocyanate (HDI), isophorone diisocyanate (IPDI) and toluene diisocyanate (TDI).

In the composition of this invention, more than one polymer may be present in the aqueous polymer dispersion. A polymer useful in this invention preferably has a $T_g$ less than 65° C., most preferably less than 60° C. $T_g$ for the polymer is measured using Differential Scanning Calorimetry with standard linear techniques for calculation of $T_g$ values. Preferably, a polymer is an acrylic polymer, acrylic-styrene copolymer, an acrylic-vinyl acetate copolymer or a polyurethane polymer. The aqueous dispersion of the polymer preferably has a pH no greater than 9.5, more preferably no greater than 8.5. Preferably, the average particle size of the aqueous dispersion is less than 1000 nm, more preferably less than 500 nm, more preferably less than 400 nm. In one embodiment of the invention, the average particle size is less than 340 nm. Average particle size is the average diameter of the polymer particles, as determined by BI-90 light scattering measurements.

Typical anionic surfactants include but are not limited to: alkali or ammonium alkyl sulfates, alkyl sulfonates, alkylaryl sulfonates (e.g., sodium dodecylbenzenesulfonate (DBS)), salts of alkyl or aryl or alkylarylethoxy sulfonates, salts of fatty acids, esters of sulfosuccinic acid salts, alkyl diphenylether disulfonates, and salts or free acids of complex organic phosphate esters. Typical nonionic surfactants include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy)ethanols having alkyl groups containing from about 7 to about 18 carbon atoms and having from about 3 to about 100 ethyleneoxy units, and polyoxyalkylene derivatives of hexitol, including sorbitans, sorbides, mannitans, mannides and alkyl polyglucosides. Amine oxides are also suitable surfactants for use in this invention. Suitable amine oxides are disclosed, e.g., in U.S. Pat. Nos. 6,448,279 and 6,485,790. Ethoxylated amines and ethoxylated quaternary ammonium compounds can also be suitable surfactants.

The aqueous composition used to treat wood preferably contains from 100 ppm to 10,000 ppm wood preservative, more preferably from 200 ppm to 6,000 ppm, and most preferably from 300 ppm to 5,000 ppm. Preferably, the composition contains from 0.001% to 3% surfactant, more preferably from 0.005% to 1%, and most preferably from 0.01% to 0.7%. In one embodiment of the invention, the surfactant level is from 0.01% to 0.4%. Preferably, the polymer solids content of the composition is from 0.03% to 10%, more preferably from 0.05% to 6%, and most preferably from 0.06% to 4%. Preferably, the polymer solids to biocide ratio is from 2:1 to 20:1, more preferably from 3:1 to 10:1.

In another embodiment of this invention, the aqueous composition used to treat wood preferably contains from 100 ppm to 10,000 ppm of an azole fungicide, more preferably from 150 ppm to 6,000 ppm, and most preferably from 200 ppm to 5,000 ppm. Preferably, the composition contains from 0.001% to 3% surfactant, more preferably from 0.002% to 1%, and most preferably from 0.005% to 0.7%. In one embodiment of the invention, the surfactant level is from 0.005% to 0.4%. Preferably, the polymer solids content of the composition is from 0.01% to 10%, more preferably from 0.02% to 6%, and most preferably from 0.03% to 4%. Preferably, the polymer solids to biocide ratio is from 1:1 to 20:1, more preferably from 2:1 to 10:1.

In another embodiment of this invention, the aqueous composition used to treat wood preferably contains from 200 ppm to 10,000 ppm halogenated carbamate biocide, more preferably from 250 ppm to 6,000 ppm, and most preferably from 300 ppm to 5,000 ppm. Preferably, the composition contains from 0.001% to 3% surfactant, more preferably from 0.005% to 1%, and most preferably from 0.01% to 0.7%. In one embodiment of the invention, the surfactant level is from 0.01% to 0.4%. Preferably, the polymer solids content of the composition is from 0.02% to 10%, more preferably from 0.025% to 6%, and most preferably from 0.03% to 4%. Preferably, the polymer solids to biocide ratio is from 1:1 to 20:1, more preferably from 2:1 to 10:1.

The aqueous composition optionally contains a non-aqueous solvent. Preferably, the amount of solvent is from 0.01% to 10%, more preferably from 0.05% to 7%, and most preferably from 0.1% to 4%. Suitable solvents include ester and ether solvents having a boiling point of at least 150° C., and preferably a flash point of at least 60° C. Examples of such solvents include glycols, and their ethers and esters, e.g., TEXANOL (2,2,4-trimethyl-1,3-pentanediol, mono-isobutyrate ester; available from Eastman Co., Kingsport Tenn.), DOWANOL DPM (dipropylene glycol, methyl ether; available from Dow Chemical Co.), DOWANOL PPH (propylene glycol phenyl ether), propylene glycol (PG), dipropylene glycol, dipropylene glycol butyl ether, dipropylene glycol propyl ether, alkyl ethers of tripropylene glycol, such as tripropylene glycol methyl ether, alkyl ethers of ethylene glycol, such as ethylene glycol monobutyl ether and alkyl ethers of diethylene glycol, such as diethylene glycol monobutyl ether, and crop oil esters, such as Archer RC sunflower oil ester.

The aqueous compositions used in the present invention may optionally contain additional components including but not limited to stabilizers, dyes, water repellents, other wood biocides, fungicides and insecticides, antioxidants, metal chelators, radical scavengers, etc. Stabilizers include, e.g., organic and inorganic UV stabilizers, such as, copper oxide or other copper salts or complexes that resist leaching; zinc oxide; iron salts, iron oxide, iron complexes, transparent iron oxide and nanoparticle iron oxide; titanium dioxide; benzophenone and substituted benzophenones; cinnamic acid and its esters and amides; substituted triazines, such as triphenyl triazine and substituted phenyl triazine UV absorbers, benzotriazole and substituted benzotriazole UV absorbers; hindered amine light stabilizers, used individually or in combination. Water repellents include, e.g., various wax-type water repellents, e.g., paraffin, carnauba, and polyethylene waxes with particle sizes <250 nm; and silicones. Other wood biocides, fungicides, such as bethoxazin and cyproconazole, and insecticides include, e.g., those listed in U.S. Pat. No. 6,610,282, e.g., imidacloprid, thiacloprid, permethrin, and etofenprox. Antioxidants include any commercially available antioxidant compounds, e.g., phosphite antioxidants such as IRGAFOS; lactone antioxidants; phenolic antioxidants such as BHT; ascorbic acid; and IRGANOX and the like. Metal chelators include, e.g., EDTA, NTA, 1,10-phenanthroline, ACUMER 3100, DEQUEST, TAMOL 731, tripolyphosphate and other inorganic and organic compounds and polymers useful in chelating or dispersing metal salts. Radical scavengers include, e.g., TEMPO.

Treatment of wood is performed by contacting the wood with the aqueous composition described herein, preferably under conditions specified in AWPA Standards C1, C2, C5, C14, C15, C22, C36, etc.

In one preferred embodiment, the treatment mixture is formulated as a concentrate in a single container, with 10-60% polymer solids, 5-30% DCOIT, 0-15% surfactant(s), and the remainder water. Preferably, the polymer is an acrylic, styrene-acrylic, vinyl-acetate-acrylic, or polyurethane that is dispersible in water. Preferably, the surfactant is nonionic.

In another preferred embodiment, the wood treatment mixture is formulated as a concentrate in two separate containers, with one container comprising 10-50% DCOIT in an organic solvent, with 0-35% nonionic surfactant, preferably 5-25%; and the other container comprising 10-60% polymer which is dispersible in water, 0-20% surfactant, and the remainder water. Preferably the surfactant is nonionic. For either of these preferred embodiments the preferred concentration of DCOIT contacting the wood is from 0.01-0.5%.

In one preferred embodiment, the treatment mixture is formulated as a concentrate in a single container, with 10-60% polymer solids, 5-30% Propiconazole or Tebuconazole, 0-25% surfactant(s), and the remainder water. Preferably, the polymer is an acrylic, styrene-acrylic, vinyl-acetate-acrylic, or polyurethane that is dispersible in water. Preferably, the surfactant is nonionic.

In another preferred embodiment, the wood treatment mixture is formulated as a concentrate in two separate containers, with one container comprising 10-50% Propiconazole or Tebuconazole in an organic solvent, with 0-35% nonionic surfactant, preferably 5-25%; and the other container comprising 10-60% polymer which is dispersible in water, 0-20% surfactant, and the remainder water. Preferably the surfactant is nonionic. For either of these preferred embodiments the preferred concentration of Propiconazole or Tebuconazole contacting the wood is from 0.005-0.5%.

In one preferred embodiment, the treatment mixture is formulated as a concentrate in a single container, with 10-60% polymer solids, 5-30% IPBC, 0-15% surfactant(s), and the remainder water. Preferably, the polymer is an acrylic, styrene-acrylic, vinyl-acetate-acrylic, or polyurethane that is dispersible in water. Preferably, the surfactant is nonionic.

In another preferred embodiment, the wood treatment mixture is formulated as a concentrate in two separate containers, with one container comprising 10-50% IPBC in an organic solvent, with 0-35% nonionic surfactant, preferably 5-25%; and the other container comprising 10-60% polymer which is dispersible in water, 0-20% surfactant, and the remainder water. Preferably the surfactant is nonionic. For either of these preferred embodiments the preferred concentration of IPBC contacting the wood is from 0.02-0.5%.

In another embodiment of the invention, a mixture comprising a halogenated isothiazolone biocide, a polymer, and at least one organic solvent is used to treat wood via, dip, spray, brush, vacuum or vacuum-pressure processes. Preferably, the halogenated isothiazolone biocide comprises a 3-isothiazolone having a $C_4$-$C_{12}$ N-alkyl substituent, more preferably a chlorinated 3-isothiazolone, and most preferably DCOIT. Preferably, suitable organic solvents include, e.g., esters, glycols, glycol ethers or esters, hydrocarbons and oils. In one preferred embodiment, the treatment mixture is formulated as a concentrate in a single container, with 10-60% polymer solids, 5-30% DCOIT, 0-35% surfactant(s), and the remainder solvent. Preferably, the polymer is an acrylic, styrene-acrylic, vinyl-acetate-acrylic, polyurethane, alkyd resin, silanol or polymeric methylene diphenylisocyanate or derivatives. Preferably, the surfactant is nonionic. In another preferred embodiment, the wood treatment mixture is formulated as a concentrate in two separate containers, with one container comprising 10-50% DCOIT in an organic solvent, with 0-35% nonionic surfactant, preferably 5-25%; and the other container comprising 10-60% polymer which is soluble or dispersible in an organic solvent, 0-20% surfactant, and the remainder organic solvent. Preferably the surfactant in the polymer container is nonionic. For either of these preferred embodiments the preferred concentration of DCOIT contacting the wood is from 0.01-0.5%.

In order to provide long term protection, the preservative needs to "fix" in the wood and not deplete too rapidly by volatilization or by leaching when the wood gets wet. It might be expected that enhanced penetration or enhanced movement of the preservative deep into the wood during treatment might also lead to reduced fixation of the organic wood preservative. However, it was discovered that the polymers used to provide enhanced penetration also effectively fix the organic biocide in the wood. Two different measures of fixation were used, a dislodgeable residue assay and a very aggressive leaching assay. The dislodgeable residue assay measures how much preservative can be removed or dislodged from the surface of the wood. This is a good assay to determine how much preservative is available or has migrated to the surface of the wood. It is surprising how significant the reduction in dislodgeable residues are as seen in Table 5. All of the polymers provided exceptional control of dislodgeable residues except for one water soluble polymer that probably redissolves under the assay conditions. Another measure of fixation is resistance to leaching. A very aggressive leaching assay, the AWPA E11-97 assay was used. DCOIT is considered a low leaching organic biocide as is seen by the cumulative % of DCOIT leached in Table 6 with the xylene formulation which doesn't contain any added surfactant. Nonionic surfactants can facilitate the leaching of organic preservatives. Even with the added nonionic surfactants, the polymers provided good leaching resistance, demonstrating cumulative leaching values comparable or lower than DCOIT in xylene, again demonstrating enhanced fixation of the organic preservatives when used in the polymer formulation of this invention.

The aqueous polymer composition used to fix organic preservatives in wood preferably contains from 100 ppm to 10,000 ppm of an organic wood preservative, such as a halogenated isothiazolone biocide, a halogenated carbamate or an azole fungicide, more preferably from 200 ppm to 6,000 ppm, and most preferably from 300 ppm to 5,000 ppm. Preferably, the composition contains from 0.001% to 3% surfactant, more preferably from 0.005% to 1%, and most preferably from 0.01% to 0.7%. In one embodiment of the invention, the surfactant level is from 0.01% to 0.4%. Preferably, the polymer solids content of the composition is from 0.01% to 10%, more preferably from 0.02% to 6%, and most preferably from 0.03% to 4%. Preferably, the polymer solids to biocide ratio is from 1:1 to 20:1, more preferably from 2:1 to 10:1.

In one preferred embodiment, the treatment mixture is formulated as a concentrate in a single container, with 10-60% polymer solids, 5-30% DCOIT, 0-15% surfactant(s), and the remainder water. Preferably, the polymer is an acrylic, styrene-acrylic, vinyl-acetate-acrylic, or polyurethane that is dispersible in water. Preferably, the surfactant is nonionic.

In another preferred embodiment, the wood treatment mixture is formulated as a concentrate in two separate containers, with one container comprising 10-50% DCOIT in an organic solvent, with 0-35% nonionic surfactant, preferably 5-25%; and the other container comprising 10-60% polymer which is dispersible in water, 0-20% surfactant, and the remainder water. Preferably the surfactant is nonionic. For either of these preferred embodiments the preferred concentration of DCOIT contacting the wood is from 0.01-0.5%.

In one preferred embodiment, the treatment mixture is formulated as a concentrate in a single container, with 10-60% polymer solids, 5-30% Propiconazole or Tebuconazole, 0-25% surfactant(s), and the remainder water. Preferably, the polymer is an acrylic, styrene-acrylic, vinyl-acetate-acrylic, or polyurethane that is dispersible in water. Preferably, the surfactant is nonionic.

In another preferred embodiment, the wood treatment mixture is formulated as a concentrate in two separate containers, with one container comprising 10-50% Propiconazole or Tebuconazole in an organic solvent, with 0-35% nonionic surfactant, preferably 5-25%; and the other container comprising 10-60% polymer which is dispersible in water, 0-20% surfactant, and the remainder water. Preferably the surfactant is nonionic. For either of these preferred embodiments the preferred concentration of Propiconazole or Tebuconazole contacting the wood is from 0.005-0.5%.

In one preferred embodiment, the treatment mixture is formulated as a concentrate in a single container, with 10-60% polymer solids, 5-30% IPBC, 0-15% surfactant(s), and the remainder water. Preferably, the polymer is an acrylic, styrene-acrylic, vinyl-acetate-acrylic, or polyurethane that is dispersible in water. Preferably, the surfactant is nonionic.

In another preferred embodiment, the wood treatment mixture is formulated as a concentrate in two separate containers, with one container comprising 10-50% IPBC in an organic solvent, with 0-35% nonionic surfactant, preferably 5-25%; and the other container comprising 10-60% polymer which is dispersible in water, 0-20% surfactant, and the remainder water. Preferably the surfactant is nonionic. For either of these preferred embodiments the preferred concentration of IPBC contacting the wood is from 0.02-0.5%.

EXAMPLES

Treatment Solutions

Preparation of the Wood Treatment Solution from DCOIT/DOWANOL PPH:

3000 g of treatment solution was prepared by diluting 90 g (50% solids) of polymer with 2000 g of tap water containing 3 drops of Tego Foamex 805 defoamer with stirring for 20 minutes. (Tap water optionally containing additional surfactant, such as a metal salt of dodecylbenzene sulfonic acid or an alkyl ethoxylate) (0.06%) To the well stirred solution was slowly added 22.5 g (20% DCOIT dissolved in propylene glycol phenyl ether with 0.04% PG, for a final concentration of 1500 ppm DCOIT). Tap water was added to make 3000 g of total solution and the solution was stirred for 60 minutes, and used as is to treat wood.

Optionally, the amount of polymer (50% solids) can be varied from 9.0 g to 180 g equally effectively in the above preparation and used to treat wood.

Prepare Treatment Solution with DCOIT Technical Material:

In the DOWANOL PPH preparation above, substitute 4.5 g of DCOIT technical material (99+%, final concentration 1500 ppm) instead of the DCOIT solution and stir the treatment solution for several days at ambient temperature, then use treatment solution as is to treat wood.

Alternative Preparation of Treatment Solution with DCOIT Technical Material.

To a heated (45° C.) suspension of 95 g of polymer G (25% polymer solids) containing 12% Tergitol 15-S-40 (70% solids) was added 5.0 g of molten DCOIT. The mixture was stirred for 15 minutes then allowed to cool to room temperature.

The wood treatment solution was prepared by diluting the above mixture with water to obtain the desired concentration of DCOIT in the treatment solution.

Preparation of the Wood Treatment Solution from DCOIT/Dowanol DPM:

In the DOWANOL PPH preparation above, substitute 18 g of 25% DCOIT in DOWANOL DPM (final concentration of 1500 ppm DCOIT) stirring as directed.

Preparation of 5.4% DCOIT Single Pack Formulation

To a well stirred, 70° C. suspension of 564.2 g of polymer G (47.5% solids) and 328.6 g of water was slowly added a 60° C. solution of 53.6 g of DCOIT dissolved in 53.6 g of Tergitol 15-S-5. The suspension was stirred at 70° C. for 1 hour. (If another surfactant and/or co-solvent was to be added, they were slowly added at this time and stirring continued for an additional 20 minutes.) The stirred suspension was allowed to cool to 35° C. then is it was packed out. The formulation was diluted to the desired concentration and used as is to pressure treat wood.

Similarly, the 6.7% DCOIT single pack formulations can be prepared by the above procedure using the following ingredients:

702.1 g of polymer G, 145.3 g of water, 67 g of DCOIT, 67 g of Tergitol 15-S-5, and 18.6 g of Tergitol 15-S-40, or 702.1 g of polymer G, 145.3 g of water, 67 g of DCOIT, 67 g of Texanol, and 18.6 g of Tergitol 15-S-40

Procedure to Treat Wood:

The above prepared treatment solutions can be used to treat wood by either pressure treatment or vacuum treatment.

Pressure Treatment Procedure:

Two 5.5×5.5×1 inch (14×14×2.5 cm) pieces of Southern Yellow Pine are loaded into a 2 L pressure vessel equipment with an inlet tube, gas/vacuum inlet, pressure sensors, dropout valve and level indicators. The vessel is sealed and the pressure is reduced to 26-27 inches of Hg (88-91 kPa) and held for 15-20 minutes. The vacuum is turned off and sufficient treatment solution is drawn into the vessel to completely cover the wood. The vessel is pressurized to approximately 150 psig (1136 kPa). A pump is used to maintain the liquid level above the wood. When no more treatment solution is taken up by the wood, the pressure is released and the vessel drained via the dropout valve. The wood can be removed at this point (full cell treatment) or a vacuum can be pulled on he vessel again for approximately 5 minutes, the vessel again drained and then the wood removed (full cell with final vacuum treatment) to partially removed some of the surface moisture from the treated wood. All of the wood reported here was treated via the full cell with final vacuum procedure.

Vacuum Treatment Procedure:

One piece of 5.5×5.5×1 inch Southern Yellow Pine is placed in a vacuum desiccator, weighted down with a stainless steel bolt to prevent it from floating and put under vacuum, 25-27 inches of Hg (85-91 kPa), and held for 15-30 minutes. Enough treatment solution is added to fully cover the wood while the wood is under vacuum. The vacuum soak is held for 30-60 minutes, then the vacuum is released and the wood is soaked in the treatment solution at atmospheric pressure for an additional 15-30 minutes before removal.

Analysis of the Treatment Solution and Wood:

A 2 g sample of the as is treatment solution is analyzed for DCOIT by HPLC. The treatment solution was found to contain 1500 ppm of DCOIT.

Analysis of DCOIT in Latex Formulations:

An aliquot of well-mixed sample was weighed into a one-ounce screw cap vial. Into the vial was pipetted 20 mL of methanol. The contents were sonicated for one hour in an ultrasonic bath. The sample was filtered through a 0.2 μm filter into an auto-sampler for analysis. The sample preparation was analyzed using a reverse phase HPLC procedure with UV detection according to the wood analysis method below.

A 3 g sample of as is treatment solution was centrifuged at 10,000 RPM for 10 minutes to precipitate any gelled polymer or other particulates. No solid precipitated. The treatment solution sample was further centrifuged at 100,000 RPM for 20 minutes to precipitated the polymer. The precipitated polymer plug and the clear supernatant were analyzed for DCOIT by HPLC. The supernatant contained 34 ppm of DCOIT and the polymer plug contained 38,000 ppm of DCOIT, demonstrating that the DCOIT had fully partitioned into the polymer.

Analysis of DCOIT in Treated Wood

Once the treated wood sample had dried to a constant weight, it was placed in a constant temperature and humidity room, and then was analyzed for DCOIT content. Using a drill press containing a ¾ inch (19 mm) Forstner bit, three holes were drilled in the wood. The location of the holes were on one face, at least ¼ inch (6.4 mm) from the sides and ends and where the grain angle was the most vertical between the two faces. One millimeter sections from each hole at depths of 1, 3 and 10 millimeters were collected, combined and analyzed for DCOIT.

A known weight of wood shaving sample is extracted in methanol by sonication for two hours. The extract is then allowed to cool to room temperature. The cooled extract is analyzed by a reverse phase high performance liquid chromatography. The DCOIT is separated from sample matrix using a 25 cm C18 column using water and methanol as mobile phase. The DCOIT is detected using ultraviolet detector set at 280 nanometers. Concentration of DCOIT in sample is determined by comparing peak area of the DCOIT peak in sample with the DCOIT peak in a standard solution using an external standard calculation method.

Particle Size Measurements:

Particle sizes were measured on a Brookhaven Instruments Corporation Zeta Plus: Zeta Potential Analyzer. The instrument parameters used are as follows: temperature 25° C., set the dust cutoff to on, set the wavelength to 633 nm and set the angle to 90 degrees. The polymer was diluted with 0.01M NaCl which contained a few ppm of Proclin antibacterial in reagent grade water. The solution for analysis was prepared by placing 2-3 drops of an emulsion polymer into 20 mL of the salt solution and inverting to mix. A clean cuvette was rinsed with the appropriate solvent and filled to ¾ capacity with salt solution. 3-5 drops of the diluted polymer emulsion was added to the cuvette, the cap is placed on top, and inverted to mix. The amount of polymer in the cuvette was adjusted so that the total counts were between 500 and 1000 kcps.

Prep of IPBC/Propiconazole/Tebuconazole+Polymer Formulations:

To make 3 liters of treatment formulation, a 56.25 g aliquot of 40% polymer G, containing 1.6% Tergitol 15-S-40, was diluted with sufficient water with stirring to obtain close to the final desired concentration. To the resulting formulation was added 18 g of a 25% IPBC/25% Tergitol 15-S-5/25% dipropylene glycol monomethyl ether/25% 2,2,4-trimethyl-3-hydroxypentanol monoisobutyrate solution with stirring. (Similarly, 18 g of a 25% Propiconazole/25% Tergitol 15-S-5/25% dipropylene glycol monomethyl ether/25% 2,2,4-trimethyl-3-hydroxypentanol monoisobutyrate or 22.5 g of a 20% Tebuconazole/26.67% Tergitol 15-S-5/26.67% dipropylene glycol monomethyl ether/26.67% 2,2,4-trimethyl-3-hydroxypentanol monoisobutyrate could be used instead). A small amount of additional water may be added, if needed, to make the desired final treatment formulation concentration. The treatment formulation was stirred overnight then used as is to pressure treat wood.

Prep of DCOIT+Propiconazole/Tebuconazole Formulations:

To make 3 liters of treatment formulation, a 33.75 g aliquot of 40% polymer G, containing 1.6% Tergitol 15-S-40, was diluted with sufficient water with stirring to obtain close to the final desired concentration. To the resulting formulation was added 7.2 g of a 25% DCOIT/25% Tergitol 15-S-5/25% dipropylene glycol monomethyl ether/25% 2,2,4-trimethyl-3-hydroxypentanol monoisobutyrate solution with stirring. Next, 4.5 g of 20% Tebuconazole/26.67% Tergitol 15-S-5/26.67% dipropylene glycol monomethyl ether/26.67% 2,2,4-trimethyl-3-hydroxypentanol monoisobutyrate solution was added with stirring. (Similarly, 3.6 g of a 25% Propiconazole/25% Tergitol 15-S-5/25% dipropylene glycol monomethyl ether/25% 2,2,4-trimethyl-3-hydroxypentanol monoisobutyrate can be substituted for the Tebuconazole solution.) A small amount of additional water may be added, if needed, to make the desired final treatment formulation concentration. The treatment formulation was stirred overnight then used as is to pressure treat wood.

Prep of DCOIT+IPBC Formulation:

To make 3 liters of treatment formulation, an 18 g aliquot of 40% polymer G, containing 1.6% Tergitol 15-S-40, was diluted with sufficient water with stirring, to obtain close to the final concentration. To the resulting formulation was added 8.11 g of a 22.2% DCOIT/11.1% IPBC/22.2% Tergitol 15-S-5/22.25% dipropylene glycol monomethyl ether/22.2% 2,2,4-trimethyl-3-hydroxypentanol monoisobutyrate with stirring. A small amount of additional water may be added, if needed, to make the desired final treatment formulation concentration. The treatment formulation was stirred overnight then used as is to pressure treat wood.

Dislodgeable Residue Assay:

The dislodgeable residue assay was conducted by placing a piece of cotton fabric that is slightly larger than the wood and moistened with 2 ml of water on the wood. A piece of aluminum foil was placed over the cotton fabric and a 12.5 kg rolling pin was rolled back and forth over the foil covered wood ten times being careful not to exert any downward nor upward pressure on the rolling pin during the rolling process. The fabric was removed and extracted with methanol in a sonication bath for 1 hour. The methanol was analyzed by HPLC for DCOIT.

Analysis of Propiconazole and Tebuconazole in Treated Wood:

A weighed aliquot of 0.36 to 0.58 mg of wood shavings was placed into a one-ounce vial and 10.0 mL of 30 water/70 ACN solution added. The sample were sonicated for 1 hour and the solvent was filtered through a 0.45 μm PALL Acrodisc® LC 25 mm syringe filter. The filtrate was transferred to an autosampler vial and 5 μL injections were made on the HPLC system for analysis. (See AWPA Standard A28-01 for HPLC conditions for analyzing Propiconazole and Tebuconazole.)

Analysis of IPBC in Treated Wood:

A known weight of wood shaving sample was extracted in methanol by sonication for two hours. The extract was then allowed to cool to room temperature. The cooled extract was analyzed by a HPLC method reported in AWPA A5-00, section 14 for IPBC.

Leaching Assay

The AWPA E11-97 leaching assay was used with the following modifications:

A single treatment rate, as indicated in the table, was used.

The Southern yellow pine cubes were pressure treated to ensure maximum uptake of the treatment solution.

An aqueous methanol solution was used to rinse out the flask and combined with each aliquot of water leachate to ensure that all of the actives were dissolved in the leachate for analysis.

Prep of the Solvent Borne Treatment Formulations:

The polymers were diluted in either xylene or 20% xylene in mineral spirits depending on the polymer's compatibility in mineral spirits and a solution of 30% DCOIT in xylene added with stirring until the desired treatment solution concentration was obtained. The treatment formulation was used as is to treat the wood.

Single and Double Dip Application:

A 5.375 inch square by 1 inch thick piece of wood was submerged in the treatment solution for 10 minutes for the single dip application and for the double dip experiment, the wood was submerged for 2 minutes, drained for 1 minute then submerged for an additional 10 minutes.

Table 1 presents the compositions of the polymers used in the wood treatment solutions. Table 2 presents penetration data for DCOIT in wood, obtained using wood treatment solutions prepared from DCOIT/DOWANOL PPH. "% retained @ 10 mm" is the amount of biocide at 10 mm as a percentage of the amount at 1 mm. Table 3 presents the effect on penetration depth of co-solvents and surfactants, with data presented for treatment solutions containing polymers M and G; the polymer:biocide ratio was 10:1, unless otherwise specified in Table 3. Table 4 presents the penetration data for IPBC, Propiconazole and Tebuconazole. Table 5 presents the dislodgeable residue data for the waterborne polymers with DCOIT. Table 6 presents the leaching results. Table 7 presents the solvent borne polymer compositions and their dislodgeable residue results.

TABLE 1

Polymer Compositions

| Polymer | Composition |
|---|---|
| A | 40.7 Sty/29.5 EHA/24.7 AN/4.9 MAA |
| B | 52.9 MMA/33.5 BA/10.4 HEMA/3.0 MAA |
| C | 52.4 MMA/45.6 BA/1 MAA/1 UMA[1] |
| D | 60.2 EA/39.7 MAA |
| E | 65.6 BA/31.8 Sty/2.5 MAA |
| F | 85 VA/15 BA |
| G | 47 Sty/46 EHA/4 MLAM/3 MAA |
| H | 67 BA/29 Sty/1.9 HEMA/1.7 AM/0.1 MAA |
| I | 39.3 BMA/29.0 Sty/21.8 EHA/5 MAA/4.6 MMA |
| J | 33.5 MMA/25.1 Sty/25.1 BA/16.1 MAA |
| K | 49.9 BA/25.0 MMA/15.0 MAA/9.9 Sty |

TABLE 1-continued

Polymer Compositions

| Polymer | Composition |
|---|---|
| L | 59.8 MMA/36.1 BA/3.9 MLAM |
| M | 67 BA/29 Sty/2.7 MAA |
| N | 53 MMA/45.6 BA/1.3 MAA |
| O | 75.9 BA/18.9 Sty/3.5 AA/1.5 IA |
| P | 40.7 MMA/35.4 Sty/23.7 BA |
| Q | 52 BA/46.6 MMA/1.3 MAA |
| R | 51.3 MMA/27.3 EHA/18.7 BA/2.5 MAA |
| S | 75.9 BA/13.9 Sty/6.9 AN/1.9 MLAM/1.0 AA |
| T | 60.0 BA/38.6 MMA/1.3 AA |
| U | 39.8 Sty/30.1 EHA/25.0 AN/4.9 MAA |
| V | 34.9 LMA/32.0 BA/31.4 MAA/1.5 MAA |
| W | 76.9 BA/19.5 Sty/2 MAA/1.4 MLAM |
| X | 52.6 MMA/46.0 BA/1.2 MAA |
| Y | 93.1 MMA/4.9 BA/1.6 MLAM/0.2 MAA |
| Z | 60 MMA/40 MAA |
| AA | 42.5 BA/42.5 MMA/5 AA/10 TMPTA[2] |
| AB | 51 PTMEG[3]/36.7 MCI/9.8 DMPA[4]/2.5 EDA |
| AC | 50.9 Sty/31.2 BA/11.8 AN/6.0 MAA |
| AD | 52.8 BA/28.7 Sty/15.0 AN/2.3 PEM/1.0 AA |
| AE | 68.6 Sty/27.8 BA/3.5 MAA |
| AF | 42.4 BA/37.4 Sty/13.6 MMA/5.0 HEMA/1.5 IA |
| AG | 46.5 Sty/42.5 BA/9.4 HEMA/1.4 MAA |
| AH | IPDI/adipic acid/1,6-hexanediol |
| AI | IPDI/adipic acid/1,6-hexanediol |
| AJ | TDI/adipic acid/1,6-hexanediol/neopentyl glycol/1,4-butanediol |
| AK | HDI/polypropylene glycol/1,6-hexanediol carbonate |
| AL | 50 AM/50 HEMA |

[1] ureidomethacrylate
[2] trimethylolpropane trimethacrylate
[3] polytetramethylene ether glycol
[4] dimethylolpropionic acid

TABLE 2

Biocide Penetration Data

| Polymer | $T_g$, °C. | particle size | pH | biocide @ 1 mm | biocide @ 3 mm | biocide @ 10 mm | % retained @10 mm |
|---|---|---|---|---|---|---|---|
| A | 56 | 95 | 7.6 | 774 | 713 | 692 | 89 |
| B | 39 | 135 | 7.5 | 709 | 913 | 567 | 80 |
| C | 19 | 135 | 9.5 | 1046 | 885 | 715 | 68 |
| D | 51 | 114 | 2.8 | 1120 | 918 | 749 | 67 |
| E | 0 | 125 | 7.5 | 1174 | 893 | 713 | 61 |
| F | 21 | 350 | 4.8 | 853 | 581 | 516 | 60 |
| G | 20 | 125 | 6.8 | 1206 | 806 | 704 | 58 |
| G* | | | | 1335 | 1498 | 1283 | 96 |
| H | −2 | 72.5 | 7.5 | 876 | 823 | 499 | 57 |
| I | 29 | 48 | 7.8 | 794 | 1021 | 452 | 57 |
| J | 62 | 60 | 6.9 | 977 | 951 | 516 | 53 |
| K | 29 | 48 | 7.2 | 872 | 1050 | 428 | 49 |
| L | 39 | 135 | 8.3 | 1131 | 1051 | 538 | 48 |
| M | −1 | 250 | 7.5 | 1194 | 1293 | 527 | 44 |
| N | 25 | 178 | 9.5 | 929 | 513 | 409 | 44 |
| O | −12 | 155 | 7 | 906 | 957 | 327 | 36 |
| P | 52 | 275 | 8.75 | 443 | 188 | 124 | 28 |
| Q | 17 | 563 | 9.5 | 674 | 489 | 187 | 28 |
| R | 20 | 100 | 8 | 1151 | 610 | 316 | 27 |
| S | −8 | 150 | 6.5 | 1326 | 1243 | 330 | 25 |
| T | 6 | 55 | 8.8 | 863 | 572 | 214 | 25 |
| U | 56 | 93 | 7.4 | 1017 | 674 | 252 | 25 |
| V | −8 | 345 | 7 | 1022 | 1136 | 251 | 25 |
| W | −12 | 360 | 9.5 | 752 | 758 | 169 | 22 |
| X | 24 | 453 | 8.9 | 946 | 416 | 124 | 13 |
| Y | 78 | 150 | 9 | 1441 | 251 | 40 | 3 |
| Z | 111 | 114 | 2.8 | 897 | 126 | 22 | 2 |
| AA | 58 | 1000 | | 139 | 109 | 12 | 9 |
| AB | | | 7.5 | 1030 | 486 | 189 | 18 |
| AC** | 54 | 98 | 7 | 1853 | 932 | 410 | 22 |
| AD** | 24 | 200 | 9 | 2635 | 1287 | 1445 | 55 |

TABLE 2-continued

Biocide Penetration Data

| Polymer | $T_g$, °C. | particle size | pH | biocide @ 1 mm | biocide @ 3 mm | biocide @ 10 mm | % retained @10 mm |
|---|---|---|---|---|---|---|---|
| AE** | 49 | 195 | 7 | 2225 | 1337 | 1203 | 54 |
| AF** | 28 | 130 | 7.5 | 1303 | 1232 | 1124 | 86 |
| AG** | 26 | 137 | 4 | 2624 | 1356 | 940 | 36 |
| AH** | −50 | 45/110 | 8 | 2965 | 1596 | 1159 | 39 |
| AI** | −52 | 35/68 | 8 | 2373 | 1756 | 1688 | 71 |
| AJ** | −33 | 179 | 7 | 1773 | 1368 | 1250 | 71 |
| AK** | −48/ | 73/204/1140 | 6 | 2043 | 1610 | 1206 | 59 |

*4:1 polymer to biocide ratio used

**5:1 polymer to biocide ratio used

TABLE 3

Effect of Co-Solvents and Surfactants on Penetration Depth

| DCOIT source | co-solvent | surfactant #1 | surfactant #2 | biocide @ 1 mm | biocide @ 3 mm | biocide @ 10 mm | % retained @ 10 mm |
|---|---|---|---|---|---|---|---|
| Polymer M | | | | | | | |
| PPH, 20% | 0.04% PG | 0.06% MDBS | | 1194 | 1293 | 527 | 44 |
| PPH 20% (*3) | 0.04% PG | 0.06% M DBS | | 1295 | 1712 | 1451 | 130 |
| Tex, 30% | | | | 256 | 110 | 83 | 32 |
| Tex, 30% | | OT, 0.09% | | 919 | 686 | 679 | 74 |
| Tex, 30% | | 15S40, 0.01% | | 370 | 241 | 206 | 56 |
| Polymer G | | | | | | | |
| P9 oil, 20% | | 0.19% Nopco | | 1268 | 1571 | 488 | 38 |
| PPH, 20% | 0.04% PG | 0.06% MDBS | | 742 | 509 | 316 | 43 |
| PPH, 20% | 0.04% PG | 0.06% MDBS | 15S40, 0.18% | 1145 | 1465 | 679 | 59 |
| PPH, 20% | *1 | 0.06% MDBS | 15S40, 0.04% | 1270 | 1259 | 662 | 52 |
| PPH, 20% (*3) | 0.04% PG | 0.06% MDBS | 15S40, 0.05% | 1222 | 1258 | 1659 | 136 |
| PPH, 20% (*4) | 0.04% PG | 0.06% MDBS | 15S40, 0.04% | 1548 | 1369 | 1283 | 83 |
| PPH, 20% (*6) | 0.04% PG | 0.06% MDBS | 15S40, 0.01% | 3569 | 458 | 333 | 9 |
| Technical (*3) | | 0.09% 15S40 | | 1332 | 1284 | 1333 | 100 |
| technical | | | | 1039 | 586 | 45 | 4 |
| technical | 0.45% DPM | OT, 0.06% | | 908 | 767 | 615 | 68 |
| technical | 0.45% DPM | 0.06% NaDBS | | 999 | 891 | 383 | 38 |
| DPM, 30% | | 0.06% NaDBS | | 265 | 281 | 175 | 66 |
| DPM, 25% | | 15S12, 0.06% | | 638 | 607 | 271 | 42 |
| *2 | | 15S40, 0.06% | 15S5, 0.3% | 1558 | 1886 | 854 | 55 |
| *2 | | 15S40, 0.06% | 15S9, 0.3% | 1100 | 1389 | 850 | 77 |
| 6.7%, *3 | 0.15% Tex | 0.03% 15S40 | | 1712 | 1434 | 932 | 54 |
| 6.7%, *3 | | | | 2340 | 1641 | 1324 | 57 |
| 5.4%, *3 | | | | 1462 | 1506 | 1322 | 90 |
| 25% in *2, *5 | | 15S40, 0.024% | 15S5, 0.15% | 1622 | 1404 | 1353 | 83 |
| 25% in Aromatic 200 ND, *5 | | 15S40, 0.024% | 15S7, 0.01% | 1474 | 1323 | 1286 | 87 |
| Polymer A | | | | | | | |
| PPH, 20% (*3) | 0.04% PG | 0.06% MDBS | | 1481 | 1497 | 1926 | 130 |
| Polymer F | | | | | | | |
| PPH, 20% (*3) | 0.04% PG | 0.06% MDBS | | 1225 | 557 | 450 | 37 |

TABLE 3-continued

Effect of Co-Solvents and Surfactants on Penetration Depth

| DCOIT source | co-solvent | surfactant #1 | surfactant #2 | biocide @ 1 mm | biocide @ 3 mm | biocide @ 10 mm | % retained @ 10 mm |
|---|---|---|---|---|---|---|---|
| Polymer S | | | | | | | |
| PPH, 20% (*3) | 0.04% PG | 0.06% MDBS | | 2198 | 1416 | 2057 | 94 |
| 25% in *2, *4 | | 15S40, 0.02% | 15S5, 0.15% | 2417 | 2058 | 1476 | 61 |

Notes:
*1 - 0.19% Tex + 0.04% PG
*2 - 1:1, 25% DCOIT in DPM: 25% DCOIT in Tex
*3 - 5:1 Polymer to DCOIT ratio
*4 - 3:1 Polymer to DCOIT ratio
*5 - 4:1 Polymer to DCOIT ratio
*6 - 1:1 Polymer to DCOIT ratio Solvents—"PG" is propylene glycol; "PPH" is DOWANOL PPH; "DPM" is DOWANOL DPM; "Tex" is TEXANOL; "P9 oil" is a high-boiling hydrocarbon oil similar to #2 diesel fuel. Listings are % DCOIT in solvent, e.g., "PPH, 20%" means a 20% solution of DCOIT in PPH.

Surfactants—"MDBS" is a metal salt of DBS; "Nopco" is NOPCOCASTOR, a sulfonated castor oil; "OT" is AEROSOL OT, a dioctyl sulfosuccinate ester; "15S[n]" is TERGITOL 15-S-[n], a branched $C_{13}$ alkyl with n ethylene oxide units, e.g., TERGITOL 15-S-40, which has 40 ethylene oxide units

TABLE 5

Percent Reduction in Dislodgeable Residues (10:1 Polymer to DCOIT Ratio unless otherwise noted, 1500 ppm DCOIT)

| Polymer | Added Surfactant | Biocide Formulation | % Reduction |
|---|---|---|---|
| — | — | *1 | 0 |
| A | — | *1 | 100 |
| B | — | *1 | 99.9 |
| C | — | *1 | 99.9 |

TABLE 4

Penetration of IPBC, Propiconazole and Tebuconazole

| Active | Treatment solution concentration (ppm) | Bio. | Polymer and ratio polymer to active | Added surfact | biocide @ 1 mm | biocide @ 3 mm | biocide @ 10 mm | % retained @ 10 mm |
|---|---|---|---|---|---|---|---|---|
| IPBC | 1500 | *1 | G, 5:1 | 0.03% 15S40 | 2090 | 1342 | 1608 | 77 |
| Propiconazole | 1500 | *2 | G, 5:1 | 0.03% 15S40 | 2614 | 1594 | 1090 | 42 |
| Tebuconazole | 1500 | *3 | G, 5:1 | 0.03% 15S40 | 2394 | 1690 | 1098 | 46 |
| IPBC + DCOIT | 300 + 600 | *4 | G, 2.67:1 | 0.01% 15S40 | | | | |
| Propiconazole + DCOIT | 300 + 600 | *2, *5 | G, 5:1 | 0.02% 15S40 | 434 (Propi) 573 (DCOIT) | 328 (Propi) 517 (DCOIT) | 238 (Propi) 380 (DCOIT) | 55 (Propi) 66 (DCOIT) |
| Tebuconazole + DCOIT % | 300 + 600 | *3, *5 | G, 5:1 | 0.02% 15S40 | 397 (Teb) 560 (DCOIT) | 294 (Teb) 540 (DCOIT) | 216 (Teb) 486 (DOOIT) | 54 (Teb) 87 (DCOIT) |

*1 - 25% IPBC/25% Tergitol 15-S-5/25% dipropylene glycol monomethyl ether/25% 2,2,4-trimethyl-3-hydroxypentanol monoisobutyrate
*2 - 25% Propiconazole/25% Tergitol 15-S-5/25% dipropylene glycol monomethyl ether/25% 2,2,4-trimethyl-3-hydroxypentanol monoisobutyrate
*3 - 20% Tebuconazole/26.67% Tergitol 15-S-5/26.67% dipropylene glycol monomethyl ether/26.67% 2,2,4-trimethyl-3-hydroxypentanol monoisobutyrate
*4 - 22.2% DCOIT/11.1% IPBC/22.2% Tergitol 15-S-5/22.25% dipropylene glycol monomethyl ether/22.2% 2,2,4-trimethyl-3-hydroxypentanol monoisobutyrate
*5 - 25% DCOIT/25% Tergitol 15-S-5/25% dipropylene glycol monomethyl ether/25% 2,2,4-trimethyl-3-hydroxypentanol monoisobutyrate
15S40 refers to Tergitol 15-S-40

TABLE 5-continued

Percent Reduction in Dislodgeable Residues (10:1 Polymer to DCOIT Ratio unless otherwise noted, 1500 ppm DCOIT)

| Polymer | Added Surfactant | Biocide Formulation | % Reduction |
|---|---|---|---|
| D | — | *1 | 99.8 |
| E | — | *1 | 99.7 |
| F | — | *1 | 99.9 |
| G | — | *1 | 99.9 |
| G** | 0.06% 15S40 | *1 | 99.8 |
| G** | | *3 | 99.2 |
| G** | | *4 | 98.7 |
| G** | | *5 | 98.7 |
| G**** | 0.04% 15S40 | *1 | 99.4 |
| G***** | 0.01% 15S40 | *1 | 89.7 |
| G*** | 0.02% 15S40 | *2 | 95.8 |
| H | — | *1 | 99.9 |
| H**** | 0.04% 15S40 | *1 | 99.3 |
| H** | 0.03% 15S40 | *2 | 83.3 |
| I | — | *1 | 100 |
| J | — | *1 | 99.8 |
| K | — | *1 | 100 |
| L | — | *1 | 99.9 |
| M | — | *1 | 99.6 |
| N | — | *1 | 99.8 |
| O | — | *1 | 100 |
| P | — | *1 | 98.3 |
| Q | — | *1 | 99.9 |
| R | — | *1 | 98.7 |
| S | — | *1 | 100 |
| S**** | 0.04% 15S40 | *1 | 99.1 |
| S**** | 0.02% 15S40 | *2 | 96.7 |
| T | — | *1 | 99.9 |
| U | — | *1 | 99.5 |
| V | — | *1 | 100 |
| W | — | *1 | 99.9 |
| X | — | *1 | 99.7 |
| Y | — | Unstable | formulation |
| Z | — | 1* | 99.2 |
| AA | — | 1* | 99.6 |
| AB | — | 1* | 99.9 |
| AC | 0.06% 15S40 | 1* | 99.5 |
| AD | 0.03%, 15S40 | *2 | 94.1 |
| AD**** | 0.04% 15S40 | *1 | 97.7 |
| AE | 0.03% 15S40 | *2 | 95.0 |
| AF | 0.03% 15S40 | *1 | 99.9 |
| AG | 0.03% 15S40 | *2 | 97.1 |
| AH | — | *2 | 98.3 |
| AI | — | *2 | 98.7 |
| AJ | — | *2 | 98.7 |
| AK | — | *2 | 98.7 |
| AL | — | *1 | −1 |

*1 20% DCOIT/67% Dowanol PPH/5% propylene glycol/8% MDBS
*2 25% DCOIT/25% Tergitol 15-S-5/25% dipropylene glycol monomethyl ether/25% 2,2,4-trimethyl-3-hydroxypentanol monoisobutyrate
*3 6.7% DCOIT/6.7% Tergitol 15-S-5/1.3% Tergitol 15-S-40/33.4% Polymer G
*4 6.7% DCOIT/6.7% Tergitol 15-S-5/1.3% Tergitol 15-S-40/33.4% Polymer G
*5 5.4% DCOIT/5.4% Tergitol 15-S-5/26.8% Polymer G
**5:1 Polymer to DCOIT
***4:1 Polymer to DCOIT
****3:1 Polymer to DCOIT
*****1:1 Polymer to DCOIT
15S40 refers to Tergitol 15-S-40

TABLE 6

Leaching Results (Modified AWPA E11-97 Protocol)

| Polymer | Ratio, Polymer to biocide, | Added surfactant (% in treatment sol'n) | Biocide Concentration and Formulation | % Biocide Leached (cumulative) |
|---|---|---|---|---|
| — | — | — | 1000 ppm, 3* | 4.4% |
| G | 4:1 | 0.03% 15S40 | 800 ppm, 1* | 2.9% |
| G | 4:1 | 0.01%, 15S40 | 800 ppm, 2* | 4.6% |
| G | 4:1 | 0.02% 15S40 | 1000 ppm, 4* | 2.4% |
| S | 5:1 | 0.02%, 15S40 | 1000 ppm, 4* | 2.1% |
| H | 5:1 | 0.02%, 15S40 | 1000 ppm, 4* | 2.2% |
| AD | 5:1 | 0.02%, 15S40 | 1000 ppm, 4* | 2.1% |
| AG | 5:1 | 0.02%, 15S40 | 1000 ppm, 4* | 2.2% |
| AF | 5:1 | 0.02%, 15S40 | 1000 ppm, 4* | 2.2% |
| AE | 5:1 | 0.02%, 15S40 | 1000 ppm, 4* | 2.3% |
| A | 5:1 | 0.02%, 15S40 | 1000 ppm, 4* | 2.3% |
| G | 4:1 | 0.01%, 15S40 | 800 ppm, 4* | 2.6% |
| G | 4:1 | 0.01%, 15S40 | 800 ppm, 4* | 1.9% |

*1 20% DCOIT/67% Dowanol PPH/5% propylene glycol/8% MDBS
*2 25% DCOIT/7% Tergitol 15-S-7/68% Aromatic 200ND
*3 30% DCOIT in xylene
*4 25% DCOIT/25% Tergitol 15-S-5/25% dipropylene glycol monomethyl ether/25% 2,2,4-trimethyl-3-hydroxypentanol monoisobutyrate
15S40 refers to Tergitol 15-S-40

TABLE 7

Solvent borne Polymers

| | Compositions | Tg | Biocide Source | Application | % Reduction of dislodgeable residues |
|---|---|---|---|---|---|
| AL | Silanol | — | 30% DCOIT in Xylene | Vac | 99.6% |
| AL | | — | 30% DCOIT in Xylene | Dbl Dip | 99.6% |
| AM | polymeric MDI | 54 | 30% DCOIT in Xylene | Vac | 99.6 |
| AM | | 54 | 30% DCOIT in Xylene | Dbl Dip | 99.6% |
| AN | 97.8 BMA/1.9 BA/ 0.1 MAA | 18 | 30% DCOIT in Xylene | Vac | 97.1 |
| AN | | | 30% DCOIT in Xylene | Double dip | 54.4 |
| AO | 49.8 BA/24.9 STY/10.6 HEMA/9.9 MMA/4.5 MAA | 19 | 30% DCOIT in Xylene | Vac | 96.7 |
| AO | | | 30% DCOIT in Xylene | Dip | 98.7 |

TABLE 7-continued

Solvent borne Polymers

| | Compositions | Tg | Biocide Source | Application | % Reduction of dislodgeable residues |
|---|---|---|---|---|---|
| AP | 68 EA/27 STY/4.9 MAA | 18 | 30% DCOIT in Xylene | Vac | 93.7 |
| AP | | | 30% DCOIT in Xylene | Dip | 98.7 |
| AQ | 54.0 BA/40.9 STY/5.0 MAA | 17 | 30% DCOIT in Xylene | Vac | 95.8 |
| AQ | | | 30% DCOIT in Xylene | Dip | 98.3 |
| AR | 52.0 STY/29.9 BA/15.0 HEMA/2.9 AA | 41 | 30% DCOIT in Xylene | Vac | 97.5 |
| AR | | | 30% DCOIT in Xylene | Dip | 98.3 |
| AS | 37.8 HEMA/33.7 STY/ 25.8 EHA/2.4 MMA | 34 | 30% DCOIT in Xylene | Vac | 97.9 |
| AS | | | 30% DCOIT in Xylene | Dip | 97.1 |

Bioefficacy Studies

DCOIT formulations were tested for efficacy against a typical brown-rot fungus. Wafers measuring 5 mm×18 mm×18 mm (l×r×t) were cut from defect-free southern pine sapwood. The soil block decay test method was carried out in accordance with AWPA Standard E10, with the following modifications:
1. Radial compression strength rather than weight loss was used to measure the extent of decay.
2. Wafers were used rather than 19 mm cubes.
3. Plastic cups holding four wafers each were used as decay chambers.
4. The incubation time was 5 weeks rather than 12 weeks.
5. The toxic threshold ranges were obtained by statistical analysis of the compression strength values for each of the biocide retention levels.

In the initial decay test, the approximate toxic threshold value for DCOIT was established for *Gloeophyllum trabeum*. Following this, DCOIT P9 oil formulation (see Table 3) and 9 sets of DCOIT formulations were run in a decay test with 10 sets of pine wafers cut from a single board. The formulation for each set contained 7 retention levels of DCOIT (0.02, 0.03, 0.04, 0.05, 0.06, 0.075, 0.09 lb/ft$^3$) (0.32, 0.48, 0.64, 0.80, 0.96, 1.2, 1.44 kg/m$^3$, respectively). The concentration of DCOIT in these formulations bridged the toxic threshold value of DCOIT so that the effect of the additives on the efficacy of DCOIT could be determined.

The approximated toxic threshold ranges ("TTR") for the various formulations are shown in Table 8. The compression strength data for formulations 4 and 6 was questionable due to erratic fungal activity so the threshold ranges were based on an evaluation of the strength loss data.

TABLE 8

| No. | Polymer | polymer:biocide weight ratio | Additives | TTR, lb/ft$^3$ (kg/m$^3$) |
|---|---|---|---|---|
| 1 | none | N/A | P9 oil, 0.19% Nopcocaster | 0.05-0.06 (0.8-0.96) |
| 2 | G | 10:1 | Dowanol PPH, 0.04% PG, 0.06% MDBS | 0.02-0.03 (0.32-0.48) |
| 3 | G | 20:1 | Dowanol PPH, 0.04% PG, 0.06% MDBS | 0.03-0.04 (0.48-0.64) |
| 4 | M | 10:1 | Dowanol PPH, 0.04% PG, 0.06% MDBS | 0.03-0.05* (0.48-0.8) |
| 5 | M | 20:1 | Dowanol PPH, 0.04% PG, 0.06% MDBS | 0.06-0.075 (0.96-1.2) |
| 6 | F | 10:1 | Dowanol PPH, 0.04% PG, 0.06% MDBS | 0.04-0.06* (0.64-0.96) |
| 7 | A | 10:1 | Dowanol PPH, 0.04% PG, 0.06% MDBS | 0.05-0.06 (0.8-0.96) |
| 8 | E | 10:1 | Dowanol PPH, 0.04% PG, 0.06% MDBS | 0.04-0.05 (0.64-0.8) |
| 9 | C | 10:1 | Dowanol PPH, 0.04% PG, 0.06% MDBS | >0.09 (>1.44) |
| 10 | none | N/A | P9 oil, 0.19% Nopcocaster | 0.06-0.08 (0.96-1.28) |
| 11 | I | 10:1 | Dowanol PPH, 0.04% PG, 0.06% MDBS | 0.04-0.05 (0.64-0.8) |
| 12 | H | 10:1 | Dowanol PPH, 0.04% PG, 0.06% MDBS | 0.04-0.05 (0.64-0.8) |
| 13 | V | 10:1 | Dowanol PPH, 0.04% PG, 0.06% MDBS | 0.04-0.05 (0.64-0.8) |

TABLE 8-continued

| No. | Polymer | polymer:biocide weight ratio | Additives | TTR, lb/ft$^3$ (kg/m$^3$) |
|---|---|---|---|---|
| 14 | B | 10:1 | Dowanol PPH, 0.04% PG, 0.06% MDBS | 0.04-0.05 (0.64-0.8) |
| 15 | K | 10:1 | Dowanol PPH, 0.04% PG, 0.06% MDBS | 0.05-0.06 (0.8-0.96) |

The invention claimed is:

1. A method for preserving wood; said method comprising contacting wood with a composition comprising:
   (a) an aqueous styrene-acrylic polymer emulsion having an average particle size less than 1000 nm, in which the polymer has a $T_g$ no greater than 39° C.;
   (b) at least one surfactant selected from among nonionic and anionic surfactants; and
   (c) at least one wood preservative selected from among halogenated isothiazolone biocides, halogenated carbamate fungicides and azole fungicides.

2. The method of claim 1 in which said average particle size is less than 500 nm and said at least one wood preservative comprises a halogenated isothiazolone biocide.

3. The method of claim 2 in which the wood preservative is 4,5-dichloro-2-n-octyl-4-isothiazolin-3-one.

4. The method of claim 3 in which said at least one surfactant comprises a nonionic surfactant containing at least 15 ethylene oxide monomer units.

5. The method of claim 4 in which the composition comprises 0.05% to 6% polymer solids, 0.01% to 1% of said at least one surfactant, and 500 ppm to 6000 ppm 4,5-dichloro-2-n-octyl-4-isothiazolin-3-one.

* * * * *